United States Patent [19]
Rasanow et al.

[11] Patent Number: 6,123,320
[45] Date of Patent: Sep. 26, 2000

[54] SANITARY DIAPHRAGM VALVE

[75] Inventors: Victor N. Rasanow, Eastlake; Robert V. Perusek, Euclid; Peter C. Williams, Cleveland Heights, all of Ohio

[73] Assignee: Swagelok Co., Solon, Ohio

[21] Appl. No.: 09/231,683

[22] Filed: Jan. 14, 1999

Related U.S. Application Data

[60] Provisional application No. 60/103,722, Oct. 9, 1998.

[51] Int. Cl.$^7$ ........................................................ F16K 7/12
[52] U.S. Cl. ............................................ 251/331; 251/366
[58] Field of Search .................................... 251/331, 359, 251/335.2, 366

[56] References Cited

U.S. PATENT DOCUMENTS

Re. 34,261   5/1993   Sule .
1,383,549   7/1921   Lang .

(List continued on next page.)

FOREIGN PATENT DOCUMENTS 458931   of 0000   Germany .
2126609   of 1972   Germany .
318754   of 1934   Italy .

OTHER PUBLICATIONS

T.E. Whiteman, "Flexible Diaphragm Actuates Laminar Flow Valve," Design News, Feb. 23, 1987.

Dr. J. P. Carvell, "Sterility and Containment Considerations in Valve Selection," Pharmaceutical Engineering, Jan./Feb. 1992; vol. 12, No. 1, pp. 31–35.

Christi, Yusuf and Moo–Young, Murray; "Clean–in–Place Systems for Bioreactors: Design, Validation and Operation" vol. 27, Bioprocess Engineering—1993, ASME 1993.

Jordan, John M.; "Integrating CIP Systems Into Process Design", BED–vol. 27, Bioprocess Engineering —1993, ASME 1993.

Young, Jack H.; "Parameters Governing Steam–in–Place Sterilization," BED–vol. 27, Bioprocess Engineering — 1993, ASME 1993.

Childers, Robert W.; Kojsza, Susan A.; "Hydrogen Peroxide Vapor Sterilization–in–Place Systems", BED–vol. 27, Bioprocess Engineering —1993, ASME 1993.

Netzel, James P.; "Seal Technology For Bioprocessing Equipment", BED–vol. 27, Bioprocess Engineering—1993, ASME 1993.

Linflo Technologies Division of Hypernetics Limited (of Ontario, Canada), product brochure for VP40D Series, Control Valves.

Amicon, Inc. (of Beverly, Massachusetts) Liquid Chromatography Systems' product brochure for K–Prime™ 400–AS, Sanitary Preparative Biochromatographs.

Amicon, Inc. (of Beverly, Massachusetts) Liquid Chromatography Systems' product brochure for K–Prime™ 40–AS, Sanitary Laboratory/Preparative Scale Bio–Chromatograph.

Triflow Controls Corporation (of Tokyo, Japan) product brochure for mu–ZERO™ 3–Way Valves.

*Primary Examiner*—Kevin Lee
*Attorney, Agent, or Firm*—Calfee, Halter & Griswold

[57] ABSTRACT

A sanitary diaphragm valve is provided that includes a generally dome shaped diaphragm having a central boss that can be connected to or driven by a valve actuator. The diaphragm includes an outer peripheral edge and a relatively thin web portion that connects the boss to the outer edge. In one embodiment, the web portion is arcuate or dome shaped. The thinner web portion permits the diaphragm to have an extended cycle life and to permit the valve to operate at higher fluid pressures. The thin web may be defined by two different contoured surfaces, one convex and the other concave, such as formed by two radiuses. A valve body is provided that includes a bowl shaped valve cavity. This valve cavity includes an outer vertical edge to permit more thorough cleaning and to eliminate entrapment areas. The valve assembly provides support surfaces for the diaphragm that reduces stress on the diaphragm particularly at higher operating pressures.

28 Claims, 13 Drawing Sheets

U.S. PATENT DOCUMENTS

| | | |
|---|---|---|
| 1,836,976 | 12/1931 | Krause . |
| 2,348,248 | 5/1944 | Elliott . |
| 2,394,911 | 2/1946 | Griswold . |
| 2,400,099 | 5/1946 | Brubaker et al. . |
| 2,631,781 | 3/1953 | Dillman . |
| 2,638,127 | 5/1953 | Griswold . |
| 2,648,351 | 8/1953 | Curtis et al. . |
| 2,701,118 | 2/1955 | Uhler ................................. 251/331 X |
| 2,707,481 | 5/1955 | McPherson . |
| 2,729,222 | 1/1956 | Dickey et al. . |
| 2,730,131 | 1/1956 | Asp et al. . |
| 2,736,332 | 3/1956 | Simmons . |
| 2,813,945 | 11/1957 | Courtot . |
| 2,865,402 | 12/1958 | Miller . |
| 2,904,068 | 9/1959 | St. Clair . |
| 2,971,470 | 2/1961 | Wein et al. . |
| 3,011,758 | 12/1961 | McFarland, Jr. . |
| 3,019,815 | 2/1962 | Lenardon et al. . |
| 3,073,341 | 1/1963 | Schernekau . |
| 3,080,887 | 3/1963 | Brandenberg . |
| 3,080,888 | 3/1963 | Brinkel . |
| 3,104,617 | 9/1963 | Barr . |
| 3,279,749 | 10/1966 | Fleckenstein et al. . |
| 3,282,556 | 11/1966 | Hancook . |
| 3,545,722 | 12/1970 | Bovio et al. . |
| 3,587,395 | 6/1971 | Nisley et al. . |
| 3,884,259 | 5/1975 | Hosmer et al. . |
| 3,884,260 | 5/1975 | Hilgert . |
| 4,014,514 | 3/1977 | Priese et al. ............................ 251/331 |
| 4,180,239 | 12/1979 | Valukis . |
| 4,314,480 | 2/1982 | Becker . |
| 4,339,111 | 7/1982 | Welch . |
| 4,484,562 | 11/1984 | Burt . |
| 4,549,719 | 10/1985 | Baumann . |
| 4,597,719 | 7/1986 | Tano . |
| 4,720,076 | 1/1988 | Hyde . |
| 4,720,079 | 1/1988 | Iizuka et al. . |
| 4,794,951 | 1/1989 | Ryzner . |
| 4,794,952 | 1/1989 | Burkard . |
| 4,836,236 | 6/1989 | Ladisch . |
| 4,848,722 | 7/1989 | Webster . |
| 4,858,883 | 8/1989 | Webster . |
| 4,860,794 | 8/1989 | Parrott et al. . |
| 4,915,017 | 4/1990 | Perlov . |
| 4,979,527 | 12/1990 | Mueller et al. . |
| 5,074,196 | 12/1991 | Michalovic et al. . |
| 5,108,069 | 4/1992 | Tada et al. . |
| 5,127,625 | 7/1992 | Kleinhappl . |
| 5,151,178 | 9/1992 | Nickerson et al. . |
| 5,172,728 | 12/1992 | Tsukazaki . |
| 5,186,434 | 2/1993 | Nishimura et al. . |
| 5,201,492 | 4/1993 | Beauvir . |
| 5,222,523 | 6/1993 | Trimble . |
| 5,265,843 | 11/1993 | Kleinhappl . |
| 5,288,052 | 2/1994 | Black et al. . |
| 5,295,662 | 3/1994 | Yamaji et al. . |
| 5,326,078 | 7/1994 | Kimura ................................. 251/331 |
| 5,333,643 | 8/1994 | Gilchrist et al. . |
| 5,335,691 | 8/1994 | Kolenc . |
| 5,361,802 | 11/1994 | Kroll et al. . |
| 5,549,134 | 8/1996 | Browne et al. . |
| 5,660,370 | 8/1997 | Webster . |
| 5,730,423 | 3/1998 | Wu et al. . |
| 5,762,086 | 6/1998 | Ollivier ............................... 251/331 X |

SANITARY DIAPHRAGM VALVE

RELATED APPLICATION

This application claims the benefit of United States provisional patent application Ser. No. 60/103,722 filed on Oct. 9, 1998 for SANITARY DIAPHRAGM VALVE (docket no 22188/05604), the entire disclosure of which is fully incorporated herein by reference.

TECHNICAL FIELD OF THE INVENTION

The present invention relates to diaphragm valves. More particularly, the invention is directed to a sanitary diaphragm valve that includes a dome shaped diaphragm and a bowl shaped valve cavity with various other features that provide a diaphragm valve that is easier to clean, has an extended cycle life and that can operate at higher pressures.

BACKGROUND OF THE INVENTION

Various fields such as, for example, biotechnology, semiconductor, pharmaceutical, food processing, and medical, require fluid handling systems that are clean and sterile while at the same time having increased cycle life and operating pressure. A very important consideration is ease with which the fluid handling components can be cleaned. The ease with which a system can be cleaned depends on, among other things, minimal dead volumes and entrapment areas. The fluid handling system must also use components that are inert to the fluid. Such systems often use valves as flow control devices, and diaphragm valves in particular are often used.

U.S. Pat. No. 5,549,134 (the "'134 patent" hereinafter), the entire disclosure of which is fully incorporated herein by reference, describes a diaphragm valve design that is particularly well suited for these various sanitary applications. The present invention is directed to various improvements and additional features in the design of the '134 patent valve to enhance its cleanability and operating performance including, among other things, its operating pressure characteristic and cycle life.

SUMMARY OF THE INVENTION

To the accomplishment of the foregoing objectives, and in accordance with one embodiment of the invention, a sanitary diaphragm valve is provided that includes a dome shaped diaphragm having a central boss that can be connected to or driven by a valve actuator, an outer peripheral region, and a relatively thin web portion that connects the boss to the outer peripheral region. In one embodiment, the web portion is arcuate or dome shaped. The thinner web portion permits the diaphragm to have an extended cycle life and to enable the valve to operate at higher fluid pressures. In accordance with another aspect of the invention, the thin web may be defined by multiple curved surfaces. In one embodiment, the multiple curved surfaces are realized in the form of two surfaces with different radiuses of curvature.

In accordance with a further aspect of the invention, a valve body is provided that includes a bowl shaped valve cavity. This valve cavity includes an outer contour to permit more thorough cleaning and to eliminate entrapment areas. In a preferred embodiment, the valve cavity outer contour is realized in the form of a substantially vertical edge joined to the cavity by a smooth transition such as a radius, for example.

In a further embodiment of the invention, the actuator housing provides support surfaces for the diaphragm that reduces stress on the diaphragm particularly at higher operating pressures.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1A:
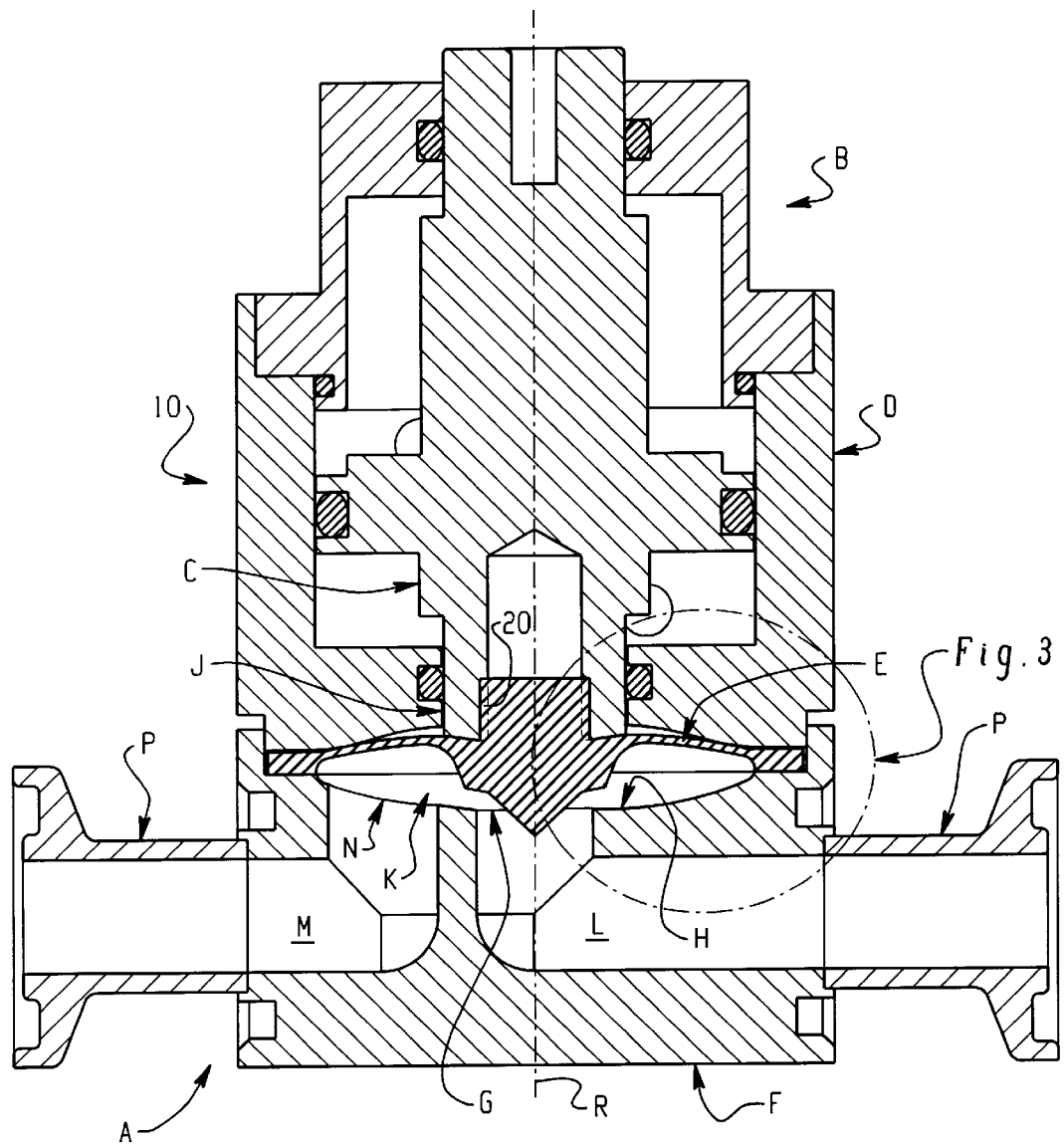
FIGS. 1A and 1B illustrate a diaphragm valve in elevation and vertical cross-section that includes a number of the features of the present invention (the valve being in an open position in FIG. 1A and a closed position in FIG. 1B)

With reference to FIG. 1A, an embodiment of a diaphragm valve and actuator assembly 10 in accordance with the present invention is illustrated in cross-sectional elevation. The assembly 10 includes a valve A and a valve actuator B. The actuator B includes a valve actuator stem C that axially moves within an actuator housing D to operate a diaphragm E in a valve body F. The valve body F and actuator housing D are mounted together and form the assembled valve A. The diaphragm B closes a port G by being pressed into engagement with a valve seat area H (see FIG. 1B). The general construction and operation of the valve assembly 10 is described in the above-referenced patent '134 and will not be repeated herein. However, the actuator housing D, the diaphragm E and the valve body F have a number of modifications as compared to the corresponding structures in the '134 patent and will be described in detail herein. However, it should be noted that a diaphragm in accordance with the present invention can be and is intended to be for many applications used in place of and as a replacement for the diaphragm of the '134 patent without other modifications to the '134 patent valve.

The actuator B in this embodiment is an air operated actuator, however, a valve in accordance with the present invention can be actuated in any manner convenient to the designer, including electromechanical actuation, hydraulic, pneumatic, manual and so forth. Therefore, the operational details of the actuator B are not essential to the present invention, except that in accordance with one aspect of the invention, the actuator stem C includes a diaphragm support structure as will be described herein below in greater detail. For purposes of the present description, it is sufficient to understand that the actuator stem C moves axially (vertically in the view of FIG. 1) so as to move the diaphragm E into and out of engagement with the valve seat H. The actuator stem C includes a tip J that supports the diaphragm as described below.

The basic valve assembly 10 further includes the valve body F having a valve chamber or cavity K formed therein as described in the '134 patent. The diaphragm E is used to seal this cavity K. An inlet fluid passage L opens to the valve cavity K at the inlet port G. An outlet fluid passage M opens to the valve cavity K at an outlet port N. Suitable fittings P can be used to provide fluid tight connections of the valve to upstream and downstream fluid conduits or other flow control devices (not shown).

Figure 2A:
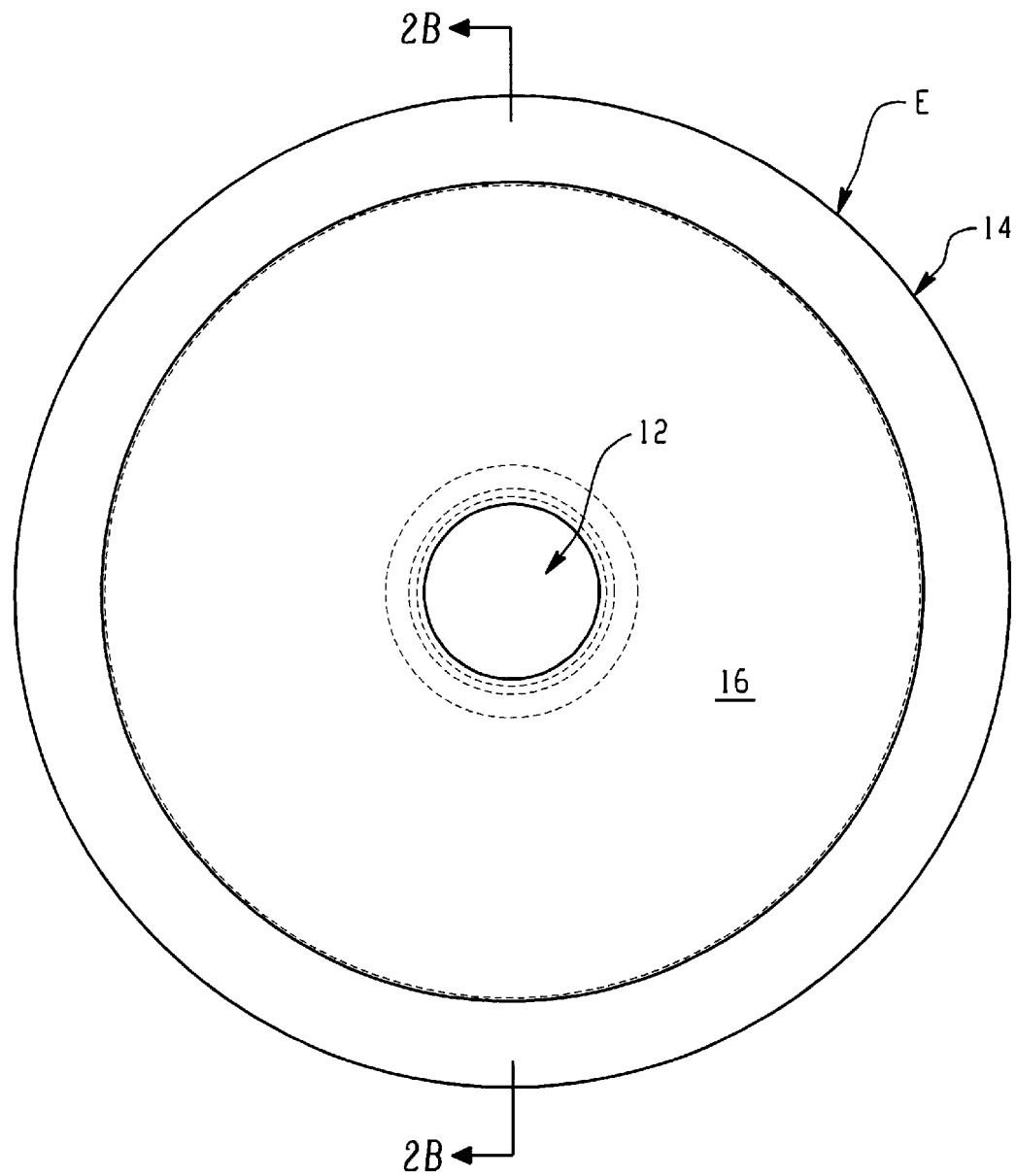
FIGS. 2A and 2B are a top view and a detailed illustration in cross-section along the line 2B—2B in FIG. 2A respectively of a diaphragm in accordance with the invention and as used in the valve of FIG. 1.
Figure 2B:
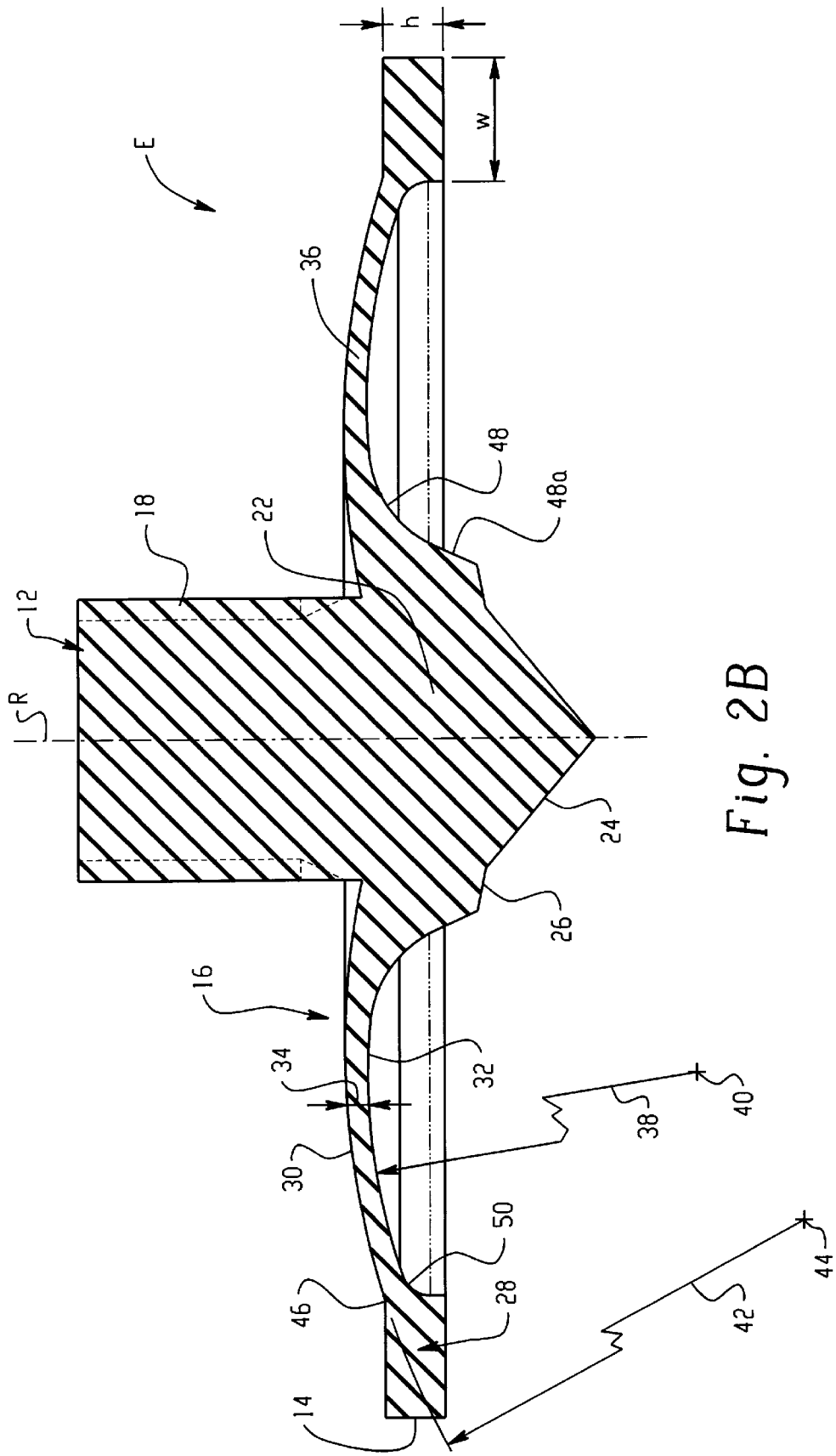

With reference to FIGS. 2A and 2B, an embodiment of the diaphragm E in accordance with the invention is illustrated in detail. As compared generally to the diaphragm of the '134 patent, the diaphragm E of the present invention is somewhat disk shaped and includes a central actuator boss 12 and an outer peripheral region or edge 14 that is joined to the boss 12 by a web portion 16. In contrast, however, the diaphragm E has a generally dome shaped or half-toroid web portion 16 so that the diaphragm E is substantially non-planar. The diaphragm E is preferably symmetrical about a central axis R, which axis coincides with the longitudinal axis of the actuator stem C (FIG. 1A).

With reference to FIG. 2B, the diaphragm central boss 12 is externally threaded as at 18. This permits the diaphragm E to be threadably joined to the actuator tip J. The tip J has corresponding internal threads 20 (see FIG. 1A). Other techniques for joining the diaphragm to the actuator tip J may alternatively be used.

The central boss 12 extends from a central diaphragm body portion 22. A conical tip 24 is formed at an end of the central diaphragm body 22 that is opposite the boss 12. The conical tip 24 is circumscribed by an annular seal surface 26. The conical tip 24 improves the flow rate of fluid through the valve. Other geometric profiles of the tip 24 may be used. For example, a frusto-conical tip may be used, as may a cone shape with a rounded or radius tip. The particular profile selected will depend on the valve design and flow characteristics desired.

The peripheral edge 14 is provided in this exemplary embodiment by a circumferential rim 28. The rim 28 is joined to the central body 22 by the continuous dome shaped web 16. As illustrated in FIG. 2B, the web 16 is a relatively thin member having a convex outer surface 30 that faces away from the valve cavity K when the diaphragm is installed in a valve body as in FIG. 1A. The web 16 also has a concave inner surface 32 that faces the valve cavity K when the diaphragm is installed in a valve body as in FIG. 1A. By "relatively thin" is meant that the web 16 is substantially thinner than the rim 28 and the central body 22 of the diaphragm E. This thin web 16 thus significantly increases the flexibility of the diaphragm E.

In accordance with one aspect of the invention, the web 16 has a non-uniform thickness 34 along its radial extent between the central body 22 and the rim 28. Alternatively, the web may have a substantially uniform thickness between the central body 22 and the rim 28. The web 16 is preferably but not necessarily thinnest in its central region 36 and gradually thickens to the areas where the web 16 joins the central portion 22 and the rim 28. By this structure, the web 16 is very flexible but avoids stress concentrations that could tend to weaken over many operating cycles.

The varying thickness of the web 16 is achieved in the embodiment of FIG. 2B by forming the outer surface 30 along a radius 42 that is centered at a first origin 44, for example, and forming the inner surface 32 along a second radius 38 that is centered at a second origin 40, for example. In the embodiment of FIG. 2B, the origins 40 and 44 are located at different spatial positions, and the first radius 38 is shorter than the second radius 42. However, these are merely examples, and for a particular diaphragm the origins 40, 44 could be the same point. In such an alternative design, having the same origin point would produce outer and inner surfaces 30, 32 that are concentric in the central portion of the web 16. Those skilled in the art will appreciate that the dome shape of the web 16 can be realized in other ways besides forming the surfaces 30, 32 along radius contours. The dome shape can be realized in any manner using arcuate-like or other contours or geometric configurations that produce a convex outer surface and a concave inner surface.

The upper surface 30 of the web 16 is joined to the rim 28 by a radius 46 or other smoothly blended transition. The inner concave surface 32 is joined to the central body 22 by a radius transition 48 or other smoothly blended transition. The inner surface 32 is also joined to the rim 28 by a radius 50 or other smooth transition or blend. In this embodiment it will be noted that the radius 48 forms or transitions from a surface 48a that extends radially outward from the central body towards the rim 28.

Figure 1B:
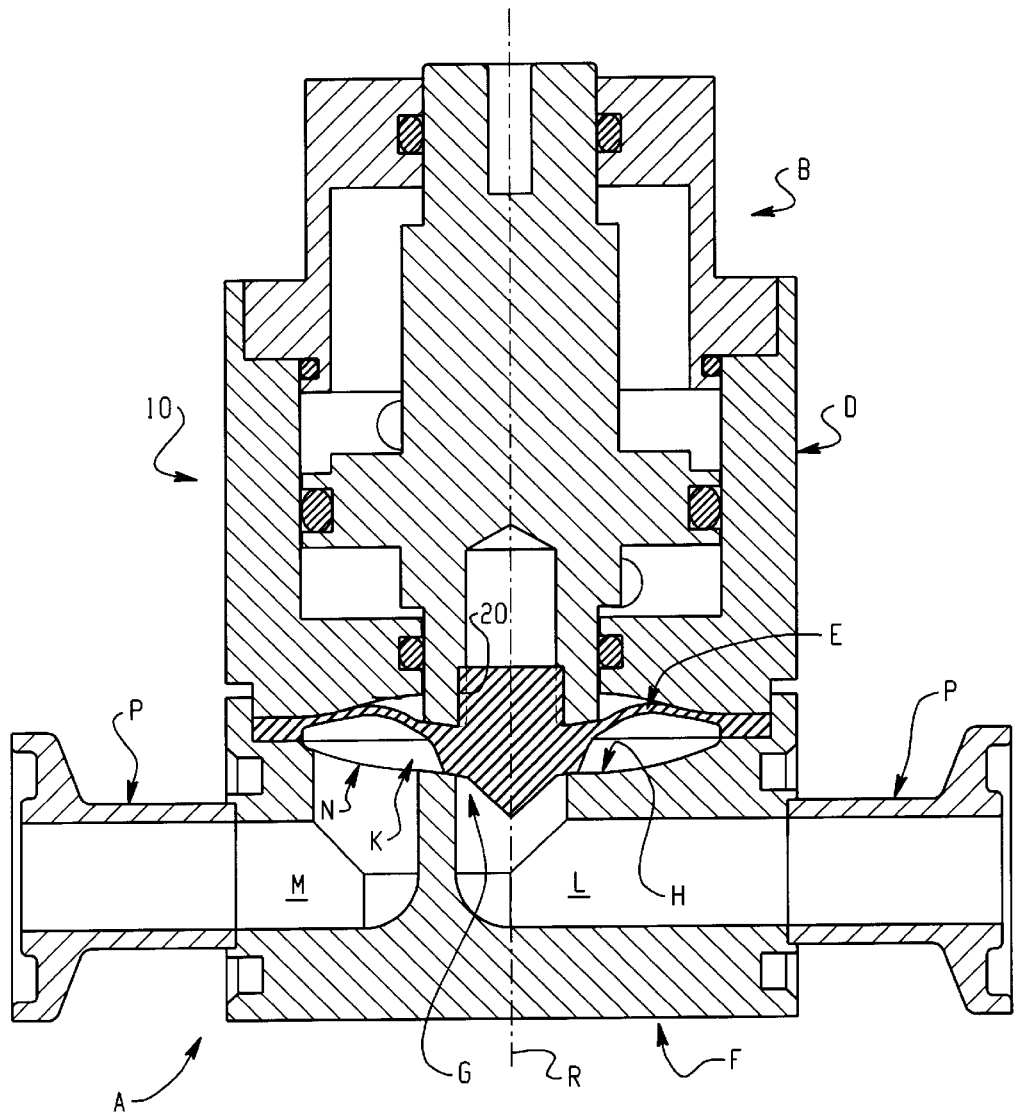

An advantage of the dome shaped diaphragm design is that the web 16 is not subjected to high tensile stress in the radial direction when the diaphragm is flexed to the closed position as illustrated in FIG. 1B. The increased flexibility of the diaphragm E also reduces the actuator force required to close the valve. This has the additional benefit of increasing the shut-off pressure rating of the valve.

In accordance with another aspect of the invention, the rim 28 is designed to have a width "w" to height "h" ratio of about two to one. This exemplary ratio helps assure that the rim 28 is not too thick because some materials will tend to cold flow, particularly polytetrafluoroethylene (PTFE). However, in applications where cold flow is not a significant concern or for different size diaphragms or where other materials are used for the diaphragm, the rim 28 can be formed with different ratios.

The diaphragm E may be made of any suitable material that is compatible with the fluid passing through the valve. Examples include PTFE and TFM, the latter being a modified version of PTFE. However, the diaphragm E can be made from any flexible material including but not limited to elastomers such as EPDM, Buna™, Viton™ and so forth and polymers such as, for example, HOSTAFLON® TF™, HOSTAFLON® TFM™, Teflon NXT™, to name a few examples.

Figure 3:
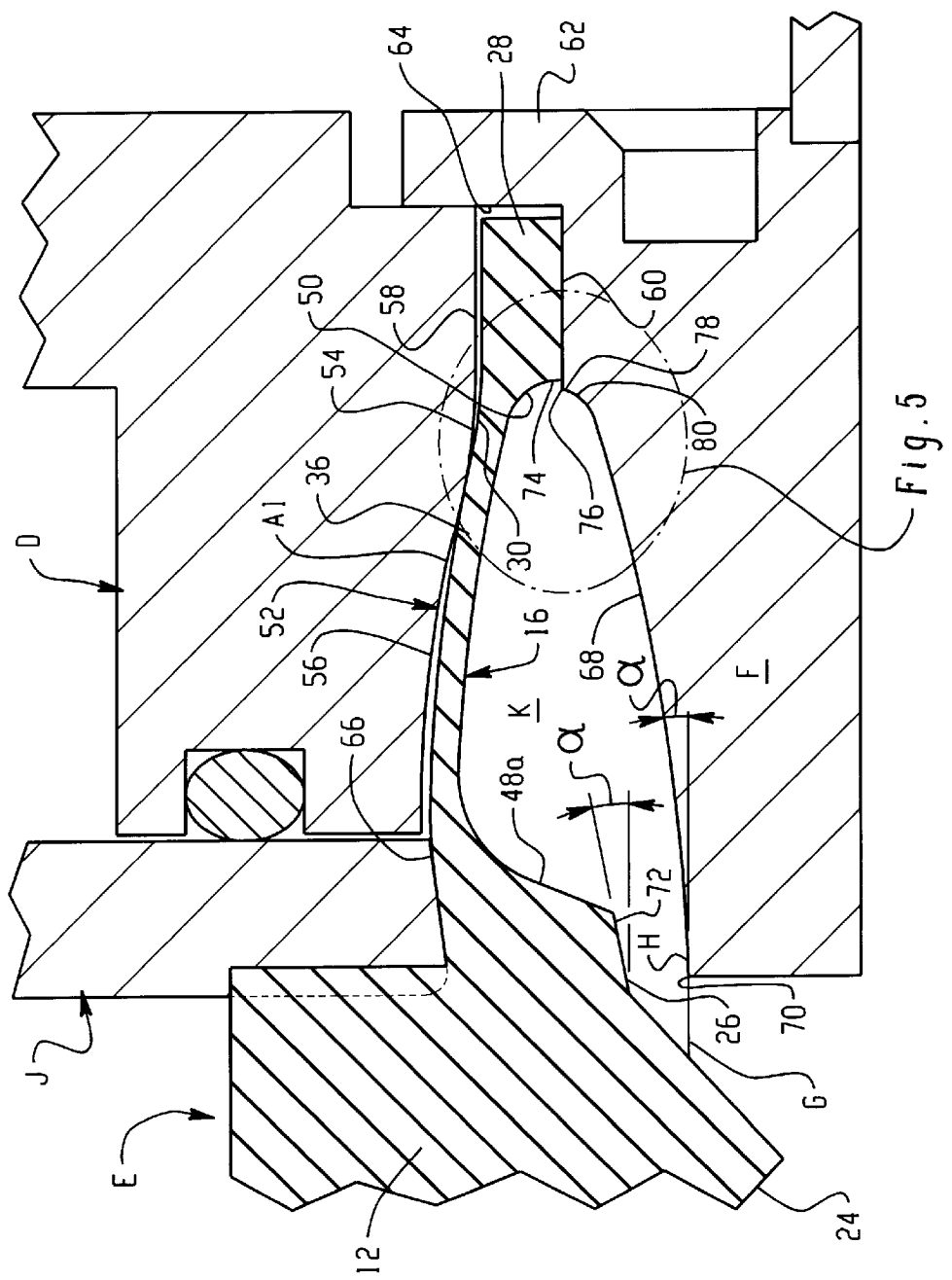
FIG. 3 is an enlarged view in cross-section of the dotted region of FIG. 1A before the diaphragm is fully clamped into the valve body.
Figure 4:
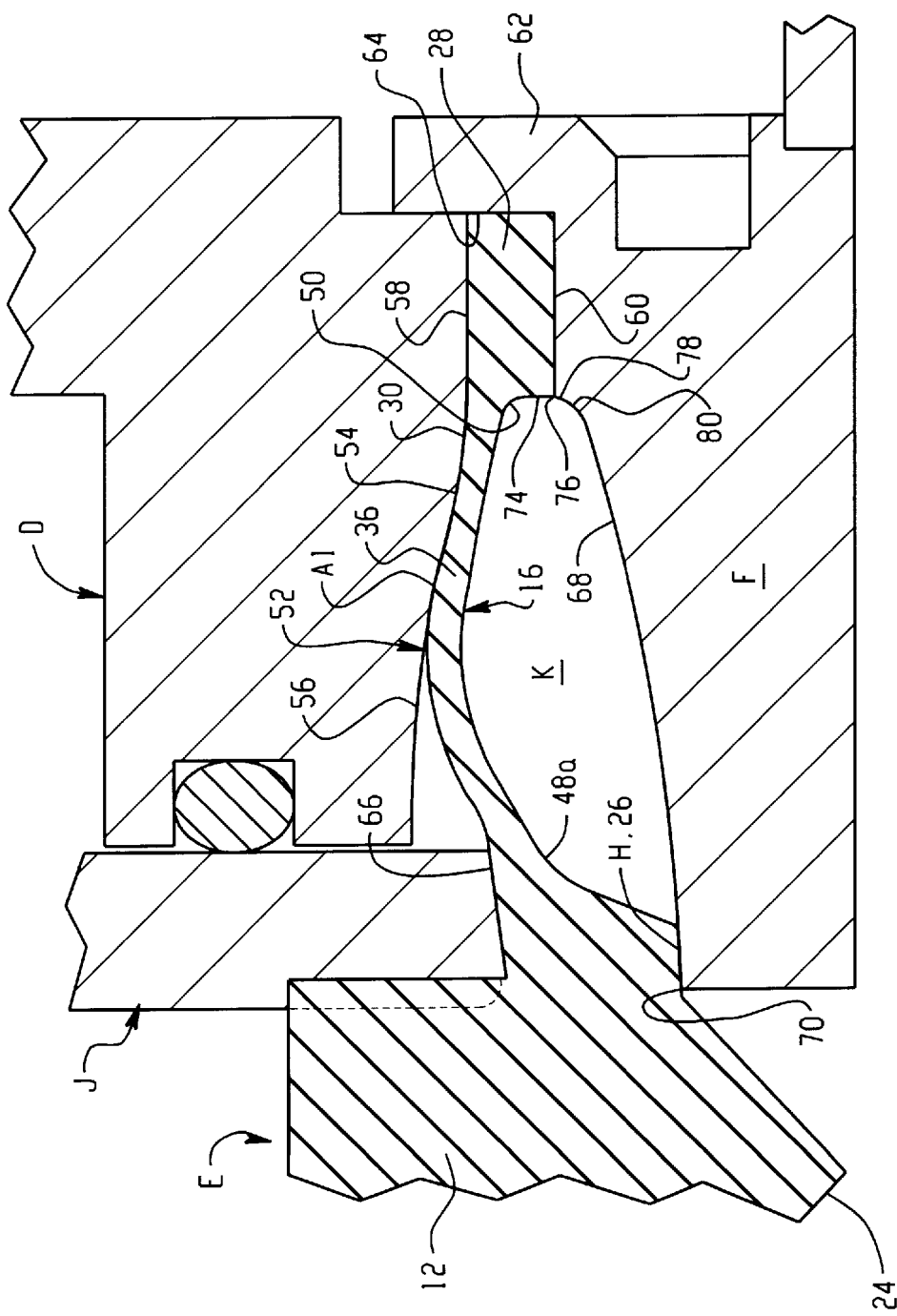
FIG. 4 is similar to FIG. 3 with the diaphragm fully clamped in the valve body with the diaphragm in a closed position and under pressure.

With reference to FIGS. 3 and 4, additional features of the invention are illustrated. FIG. 3 is an enlarged view of the dotted area in FIG. 1A to show various aspects of a diaphragm support structure. FIG. 3 shows the diaphragm E before it is fully clamped in the valve assembly, and FIG. 4 shows the same area after the diaphragm is fully installed and under pressure.

As noted herein before, a significant advantage of the diaphragm E is the use of the thin web 16. The thin web 16 substantially increases the flexibility of the diaphragm E. This increased flexibility allows the actuator C (FIG. 1B) to move the diaphragm to a closed position against higher fluid pressures with similar closing force. However, the thinner flexible web 16 will also tend to bow out or balloon under a number of different circumstances including when the valve is open with a higher inlet fluid pressure, or when the valve is being closed against higher fluid pressures, or when the valve is closed and there is substantial back pressure from the outlet fluid passage M (FIG. 1B). Therefore, in accordance with another aspect of the invention, a support structure is provided for the diaphragm E to permit a thin web 16 to be used. Different techniques can be used to support the diaphragm in accordance with the invention, a few examples of which will now be described.

In FIG. 3, the actuator housing D is formed with a diaphragm support surface 52. In this embodiment, the support surface 52 includes a radially outward convex portion 54 that transitions as at A1 to a radially inward concave portion 56.

The actuator housing D also includes a peripheral flat clamping portion 58 that cooperates with an opposed peripheral flat or near flat clamping portion 60 of the valve body F. The rim 28 is sandwiched and compressed between the actuator housing flat 58 and the valve body flat 60 to thus clamp the diaphragm E in the valve assembly. As shown in FIG. 4, when the actuator housing D and the valve body F are tightened together, the rim 28 is compressed and radially expands due to the resilient nature of the diaphragm E material. An axial extension 62 of the valve body provides a radially adjacent wall 64 that engages the compressed rim 28, thus preventing cold flow of the rim 28 in a radially outward direction.

In some valve designs, the actuator housing D will not always be adjacent the diaphragm upper surface 30, but rather some other structural member of the valve or actuator (such as a bonnet for example) will serve the purpose of clamping the diaphragm into the assembly 10. In such cases, this structural member can be modified to include an extension or other portion that overlays and supports the diaphragm E outer surface.

The convex diaphragm support portion 54 initially engages and supports the diaphragm outer surface 30, particularly when the valve is open (as viewed in FIG. 3). If there is significant inlet fluid pressure from the inlet port G, the diaphragm will tend to bow upward. However, the upper surface 30 of the diaphragm will then be in contact with or engage the concave portion 56 to prevent excessive bowing. The radially inward portion 56 is concave to more closely conform to the shape of the domed diaphragm, particularly when the diaphragm is bowed due to high pressure. The concave contour 56 can thus support a significant portion of the radially inward outer surface area of the diaphragm E. However, those skilled in the art will appreciate that the concave portion could also be planar or convex as required for a particular application, as could the convex portion 54. Furthermore, in the preferred embodiment of FIG. 3 the support surface extends from the rim 28 area to about the actuator stem J. However, some valve housing designs may not allow for this much support surface structure. The design effort should be directed to maximizing the area of support for the outer diaphragm surface 30, particularly in its thinnest region 36 and near the central boss 12.

Thus, the contour of the support surface 52 illustrated in the drawings is intended to be exemplary in nature. This contour should be designed to support as much of the outer surface 30 area of the diaphragm as possible, especially when the diaphragm is under high internal pressure force.

The actuator tip J can also be used to provide a diaphragm support surface. As illustrated in FIG. 3, the tip J includes an angled lower surface or radius or other suitable contour 66 that extends radially outward to engage and support a radially inner portion of the diaphragm E near the boss 12.

As indicated on FIG. 3, the annular seal surface 26 is formed at an angle $\alpha$ from flat. The valve chamber K is defined in part by the curvilinear bowl-shaped contour 68 of the valve body F. An annular valve seat area H adjacent the inlet port G is formed flat or at an angle that is preferably less than the angle $\alpha$ of the seal surface 26. The seal surface 26 is appropriately dimensioned in the radial direction so that an annular seal seat edge 70 contacts the seal surface 26 approximately in a central area 72 thereof. The angle $\alpha$ assures that the surface 26 initially contacts the valve seat 70 with a line seal. This assures a high contact pressure between the seal surface 26 and the seat 70 even with the higher flexibility of the diaphragm E. The angle a can be, for example, about eleven degrees.

As noted herein before, the valve body F is formed with the bowl shaped contour 68 to define part of the valve chamber K. As illustrated in FIGS. 3 and 4, the diaphragm rim 28 is dimensioned with a width "w" such that in a clamped state (FIG. 4) an inner radial edge 74 of the rim is spaced radially inward or aligned flush with an edge 76 of the valve contour 68. When the rim 28 is compressed between the housing flat 58 and the body flat 60, as shown in FIG. 4, the rim 28 is squeezed such that its inner edge 74 either aligns flush with the contour edge 76, or slightly overlaps the contour edge 76. This significantly improves the cleanability of the valve. The rim 28 should be dimensioned so that when it is compressed it will not be positioned radially outward of the cavity edge 76 because such a condition would present an entrapment area.

In addition to forming a flush or slightly overlapped alignment between the edge 76 and the inner edge 74 of the diaphragm rim 28, the rim 28 is joined to the diaphragm web portion 36 by a radius or other smooth transition 50 that terminates at a surface 74 that is preferably, but not necessarily, substantially parallel to the longitudinal axis R of the diaphragm. Similarly, the valve cavity edge 76 is preferably formed by a radius or other smooth transition 80 that terminates at one end at a surface 78 that is preferably, but not necessarily, substantially parallel to the longitudinal axis R of the diaphragm and/or the flow axis through the outlet port N. The transition 80 at an opposite end transitions into the bowl shaped contour curvilinear surface 68 that defines part of the valve chamber. This arrangement significantly improves the cleanability of the valve.

Figure 5:
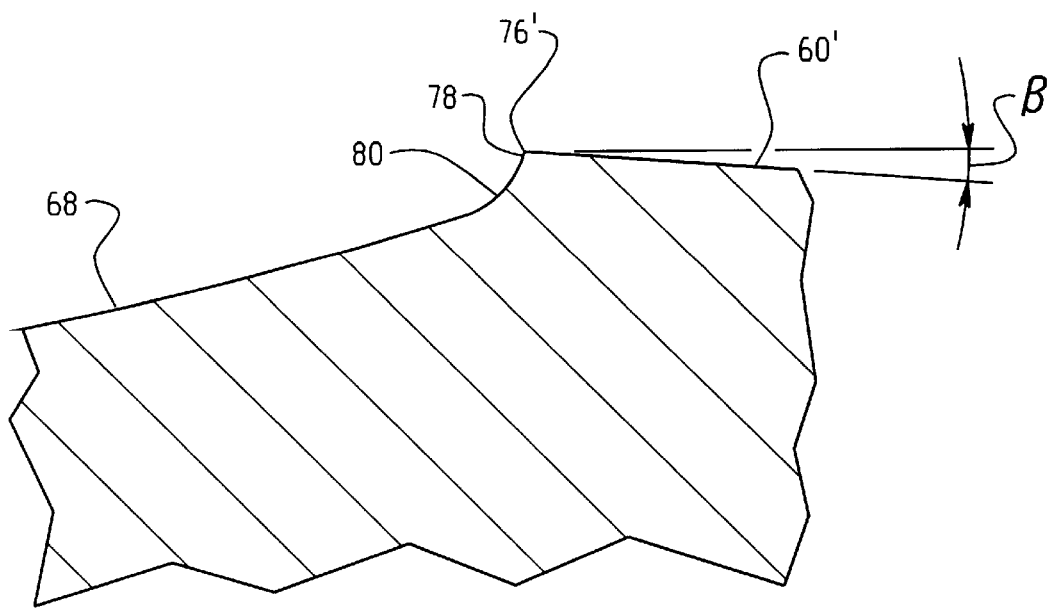
FIG. 5 is an enlarged view of an alternative embodiment of a diaphragm clamping surface.

With reference to FIG. 5, an alternative design for the rim 28 clamping area is illustrated. FIG. 5 shows an enlarged detail of the encircled area in FIG. 3, in particular the valve body clamping surface 60. In this embodiment, the clamping surface 60' is declined at an angle $\beta$ from flat. In the exemplary embodiment the angle $\beta$ is about 3°, however, other values for $\beta$ can be used as required for a particular application. This assures that when the diaphragm rim 28 is clamped between the surface 60' and the opposite clamping surface 58, a sharp edge 76' will contact the rim 28. This sharp edge contact has been found to improve, in many cases, the cleanability of the valve.

Figure 6:
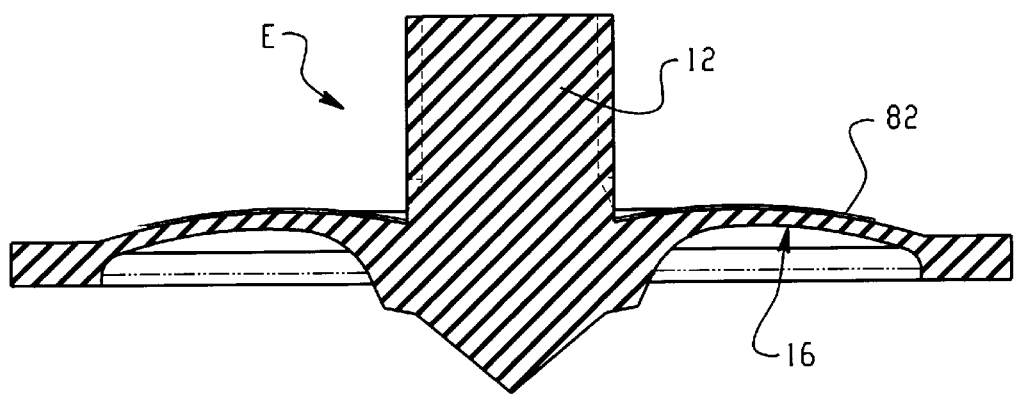
FIG. 6 illustrates another aspect of the invention to provide support to the diaphragm web.

FIG. 6 illustrates another aspect of the invention. As noted herein above, some valve designs may prevent the designer from being able to incorporate a support surface 52 (FIG. 3) for the diaphragm web 16. Or possibly the valve body and actuator body structures prevent the design of a support structure 52 that sufficiently covers a large portion of the web 16, particularly the radial inner portion of the web 16. In such cases, and even for valves in which the support structure 52 can be used, backup rings or disks 82 can be laid on top of the diaphragm web 16 to support the web. The rings may be a single ring or a set of stacked rings that are formed of a suitable stiff material such as metal. These rings 82 can simply be laid on top of the diaphragm E. As shown in FIG. 6, the rings 82 may be contoured to conform to the unstressed contour of the domed web 16, more specifically the curvature of the outer convex surface 30. In the embodiment of FIG. 6, the rings 82 extend to the boss 12 and thus will be securely held by the actuator tip J. Other available options include but are not limited to having the rings 82 loosely overlay the outer convex surface 30 without extending all the way to the boss 12, or the rings could be sandwiched and held at their perimeter by the actuator housing D or otherwise secured to the outer surface of the diaphragm.

Figure 7A:
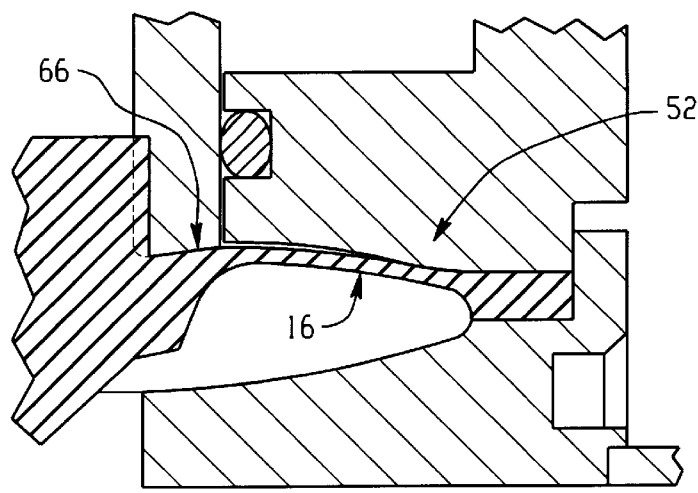
FIGS. 7A–7C illustrate operation of the flexible diaphragm under different operating conditions based on finite element analysis.
Figure 7B:
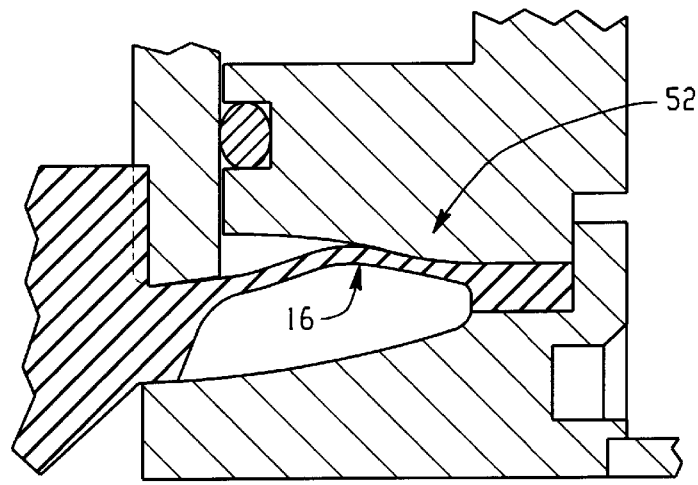
Figure 7C:
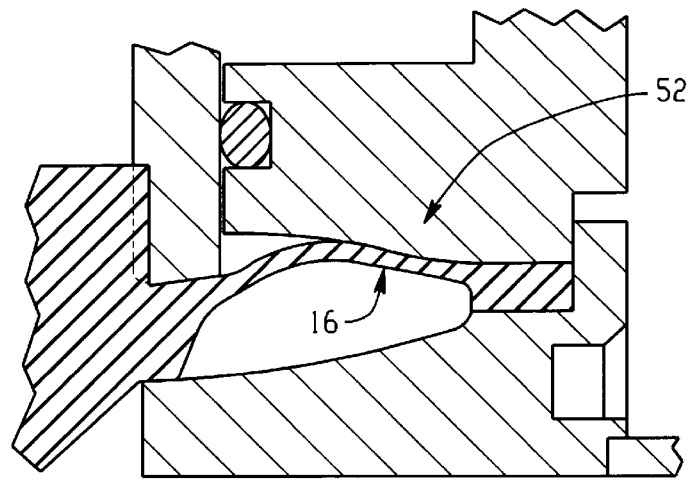

FIGS. 7A–7C illustrate operation of the flexible diaphragm E. These figures are based on finite element analysis of the diaphragm during simulated operating conditions. Therefore, the only structures shown are portions of the diaphragm E, the actuator tip J, and the actuator body D. In FIG. 7A the diaphragm E is in a fully open position with an inlet fluid pressure of about 65 psi. Note that the diaphragm web 16 is substantially supported by the support structure 52 of the actuator body and the contoured surface 66 of the actuator tip J. In FIG. 7B the diaphragm E is shown in a fully closed position with an internal pressure of about 65 psi. First it is noted that the diaphragm web 16 balloons substantially but much of the web is supported against the contoured surface of the support surface 52. FIG. 7C illustrates the diaphragm in a fully closed position but at an internal pressure of about 120 psi. Even though the higher pressure further balloons the web 16, this pushes more of the web into supporting contact with the support structure 52. Thus, the thin web diaphragm E performs well even at higher operating pressures. The thinner more flexible web further facilitates the diaphragm 16 to be closed against these higher pressures.

Figure 8:
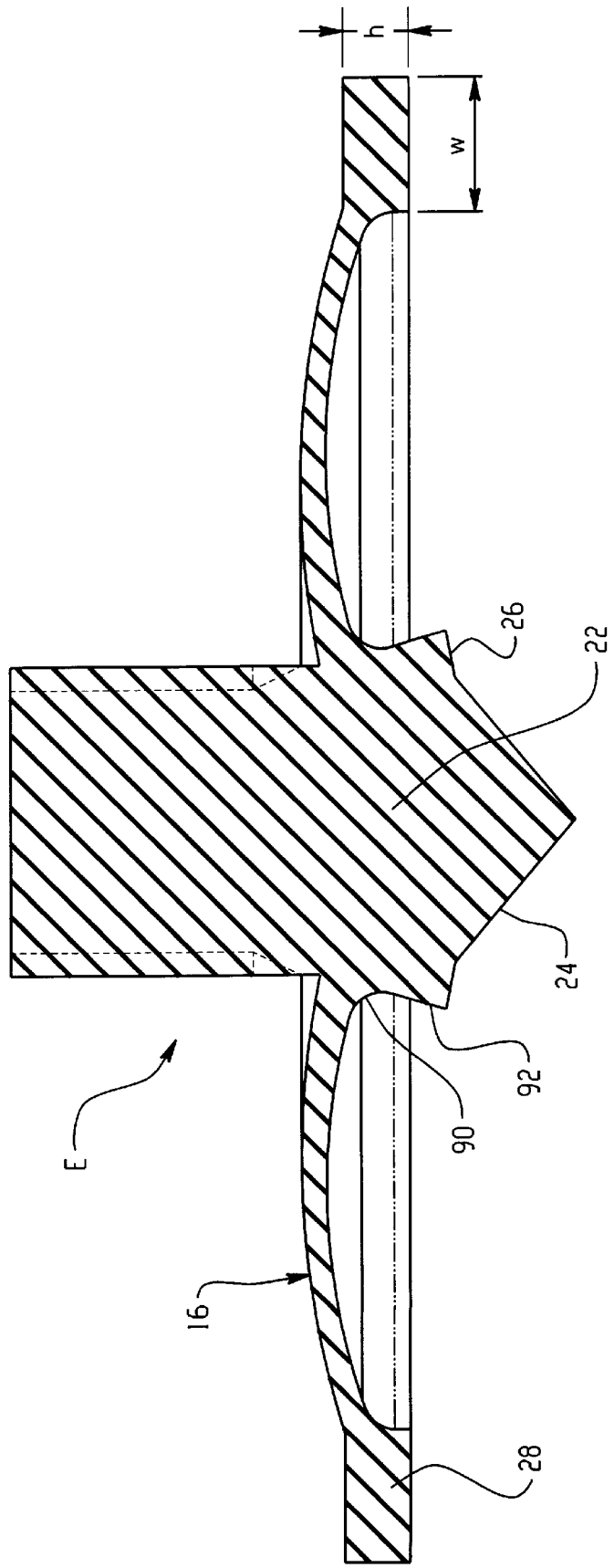
FIG. 8 illustrates an alternative embodiment of the diaphragm in accordance with another aspect of the invention.

FIG. 8 illustrates an alternative design for the diaphragm E. All features of the diaphragm E are the same as the embodiment of FIG. 2B except as to the transition region between the web 16 and the central body 22. The thin web 16 greatly increases the flexibility of the diaphragm E. However, in some applications even greater flexibility may be desired. In such cases, the web 16 concave surface 32 is joined to the central body 22 by a radius 90 or other smooth transition. However, in this case, the transition 90 forms or transitions to a surface 92 that extends radial inwardly towards the central body 22, thus forming an undercut in the central body 22. This configuration thus provides a substantially thinner joint or transition between the web 16 and the central body 22, as compared to the embodiment of FIG. 2B, thus increasing the flexibility of the diaphragm. The tradeoff is that the undercut presents a potential entrapment area, or region that may be difficult to clean in some applications.

Figure 9A:
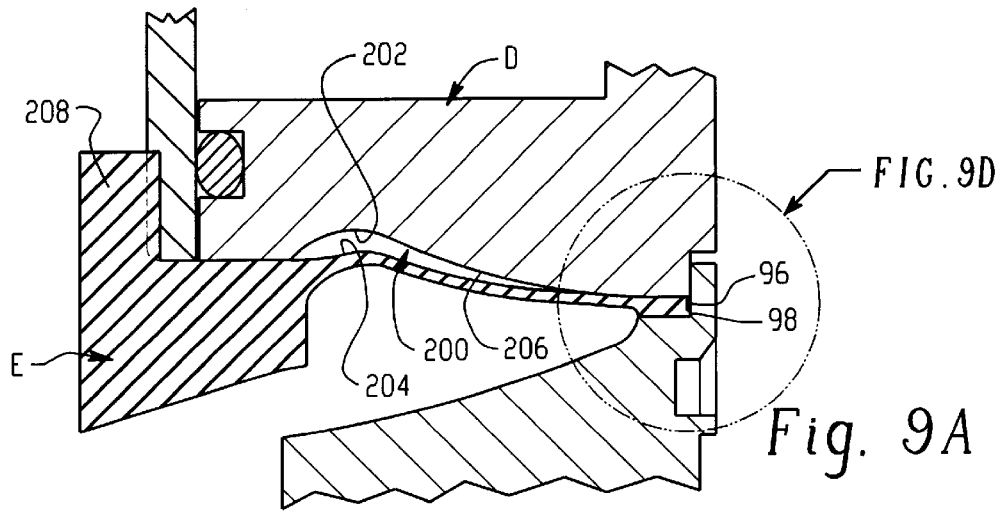
FIGS. 9A–9D illustrates a further embodiment of the diaphragm.
Figure 9B:
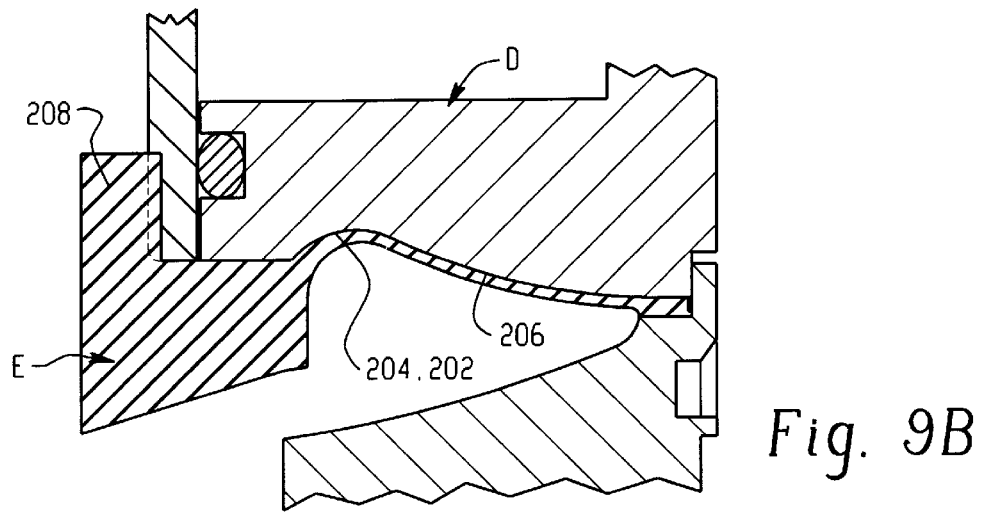
Figure 9C:
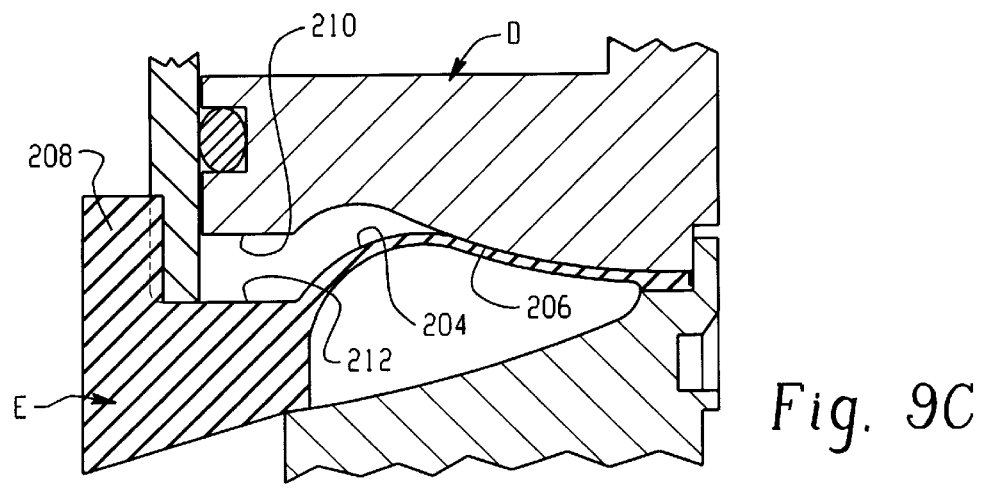

FIGS. 9A–9D illustrates further embodiments of the diaphragm. In FIGS. 9A–9C, the diaphragm E is illustrated in an open position without pressure in the valve, open position with the valve under pressure, and in a closed position, respectively. In this embodiment, the support surface 200 which is formed in the actuator housing in this embodiment, includes an annular recess 202. The annular recess 202 is configured to receive and support the diaphragm upper surface 204 which can bow or balloon significantly when the valve is under pressure and the diaphragm is in the open position. The shape of the recess 202 will be selected to best conform to the diaphragm for providing adequate support. The support surface 200 further includes the transition to a convex portion 206 as in the other embodiments described herein.

The valve illustrated in FIGS. 9A–9C is a larger valve than that illustrated in the other drawings herein. Thus, the diaphragm E includes a larger diameter central boss 208. The support surface 200 is therefore provided with a corresponding flat 210 that may engage the boss 208 upper surface 212 when the diaphragm is in the open position as in FIGS. 9A and 9B for example. The diameter of these planar regions 210, 212 will vary with the size of the diaphragm and valve. FIGS. 10A–10E illustrate various examples of different size diaphragms (FIG. 10A being a larger valve to FIG. 10E being a smaller valve) and the corresponding changes in configuration of the support surface, however, all the diaphragms share the basic features of the invention as described herein above.

Figure 9D:
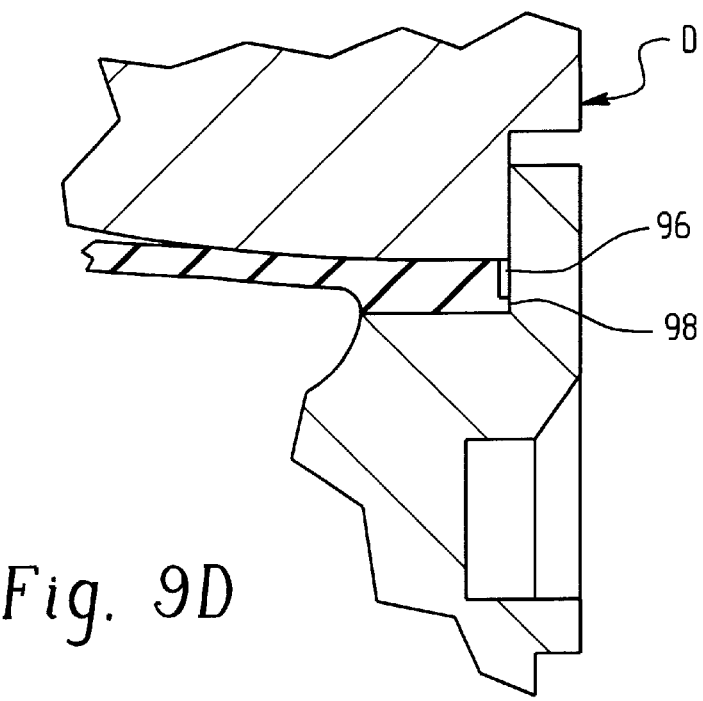
Figure 10A:
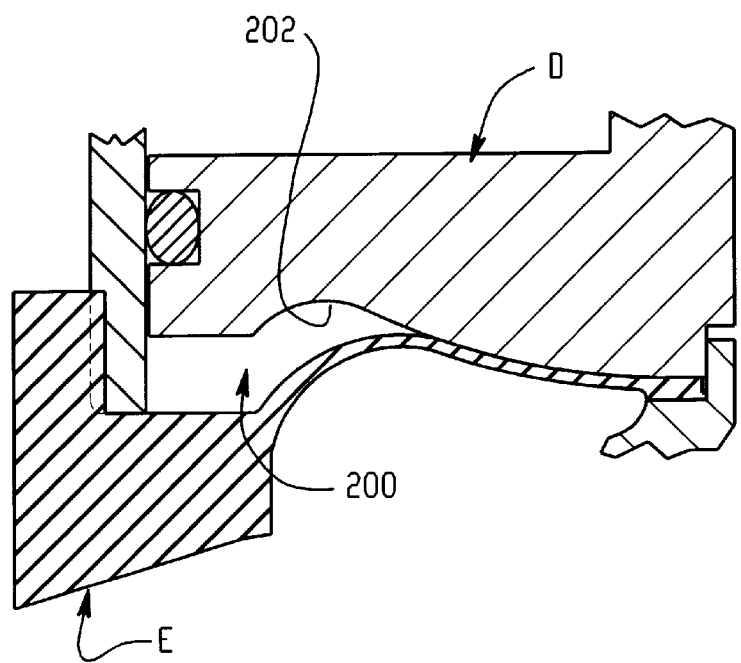
FIGS. 10A–10E illustrate various sized diaphragms in accordance with the present invention.
Figure 10B:
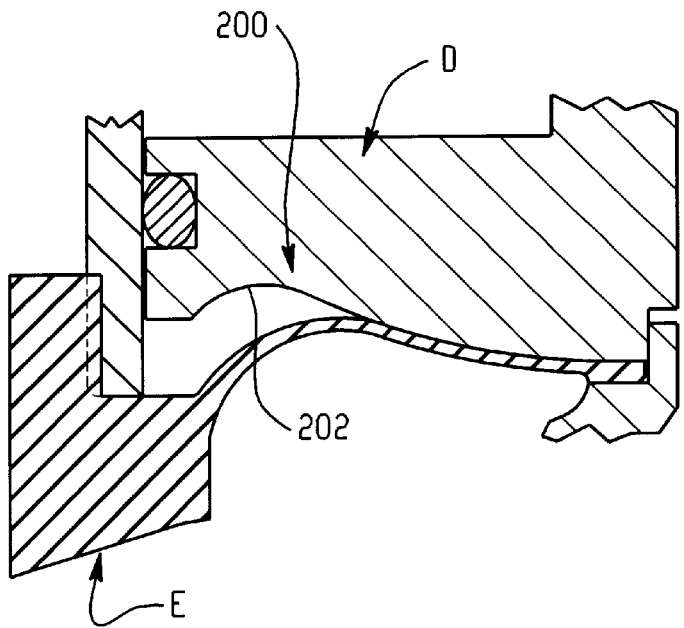
Figure 10C:
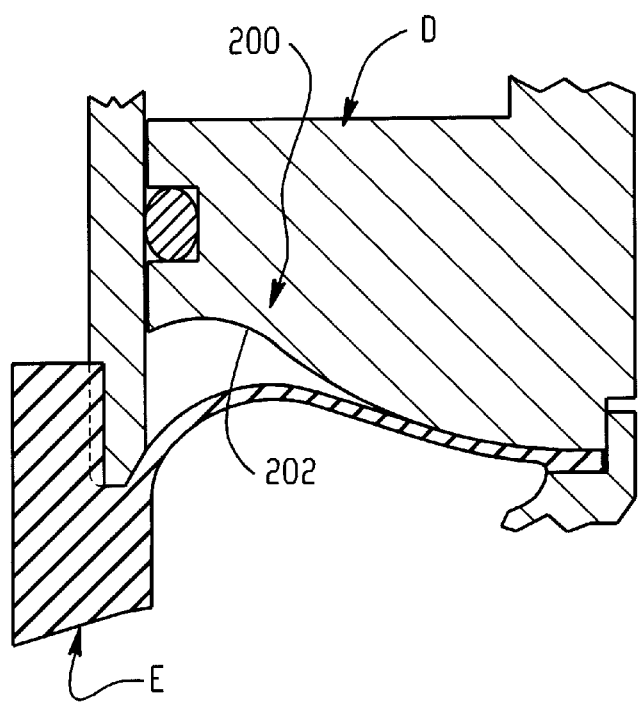
Figure 10D:
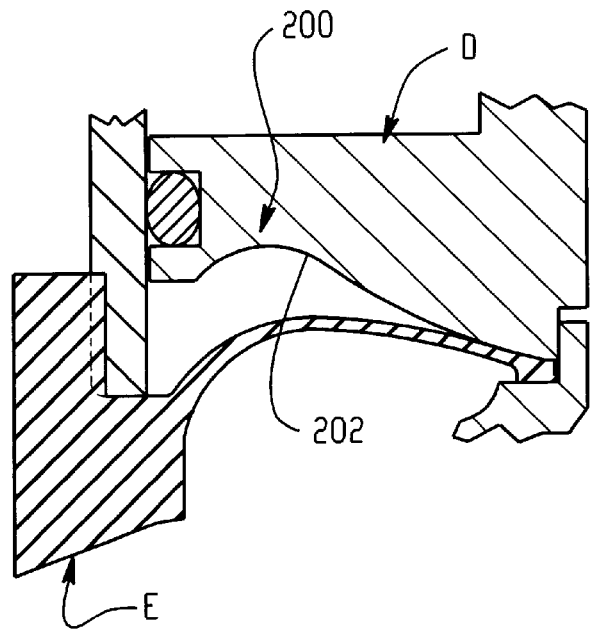
Figure 10E:
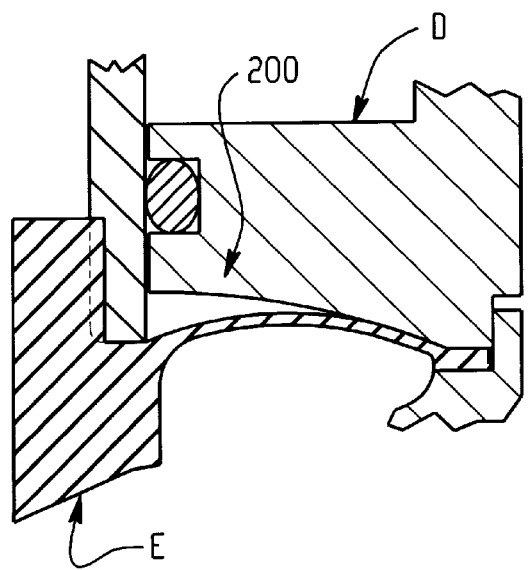

In the embodiments of FIGS. 9A–9C, the peripheral edge region 14 is formed with an upper notch or recess 96 formed in the rim 28. FIG. 9D shows an enlarged view of the notch 96. This notch 96 is preferably but not necessarily circumferentially continuous and uniform. The notch 96 defines a circumferential tab portion 98. The diameter of the tab 98 is selected to have a close or slip fit with the inner wall 64 of the valve body (FIG. 3) such that the tab 98 functions to accurately center the diaphragm E in the valve body F prior to clamping down the actuator housing D. The notch 96 allows the diaphragm E to deform in the region 100 when the actuator housing D is over-torqued when joined to the valve body F. Without the notch 96, in some cases the diaphragm may deform in the region 102 which would be less desirable for overall performance of the diaphragm. Thus it is contemplated that the notch 96 can be a feature used with the various diaphragm designs illustrated and/or described herein.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A diaphragm valve comprising:

a valve body having a cavity therein defining a fluid chamber;

a port that opens to said chamber;

a diaphragm that seals said chamber, said diaphragm comprising a central boss along a longitudinal axis, said boss having a seat end and an actuator end; an outer edge region and a web portion that connects said boss and said edge region;

an actuator connected to said actuator end of said boss; said actuator being operable to move said boss axially from an open position to a closed position at which said seat end seals said port from said fluid chamber;

said web portion being dome shaped with a convex surface that faces said actuator end of said boss, and a concave surface that faces said seat end of said boss;

said cavity comprising a bowl shaped recess defined by a curvilinear surface that joins a circumferential edge that is substantially parallel to said longitudinal axis, and said diaphragm outer edge region being defined by a portion that is generally parallel to said longitudinal axis.

2. The valve of claim 1 comprising a contoured support surface that partially engages said convex web surface in its open position.

3. The valve of claim 2 wherein said actuator has a surface that partially engages said convex web portion in its open position.

4. The valve of claim 2 wherein said contoured surfaces engage substantially all of said web surface when said diaphragm is in its open position and subjected to fluid pressure.

5. The valve of claim 4 wherein said support contoured surface includes a convex portion and a concave portion.

6. The valve of claim 5 wherein said concave portion is radially inward of said convex portion with respect to said actuator.

7. The valve of claim 3 wherein said boss is joined to said actuator at a connection, and wherein said actuator surface extends radially outward from said connection.

8. The valve of claim 3 wherein said actuator surface is contoured.

9. The valve of claim 1 wherein said outer edge region is clamped between said valve body and an actuator housing.

10. The valve of claim 9 wherein said outer edge region is joined to said web portion by a contoured surface that terminates in a surface that is generally parallel to said boss longitudinal axis.

11. The valve body of claim 10 wherein said cavity comprises a bowl shaped recess in said valve body facing said diaphragm; said cavity having a curvilinear surface that is joined by a radius surface to a circumferential edge surface that is substantially parallel to said boss longitudinal axis.

12. The valve of claim 11 wherein said outer edge parallel surface and said bowl circumferential edge surface are substantially adjacent and flush with each other when said diaphragm is clamped between said valve body and actuator housing.

13. The valve of claim 1 wherein said central boss has a hub that lies along said longitudinal axis; said seat end of said central boss being characterized by an annular surface that extends radially from said hub and is axially spaced from said web portion.

14. The valve of claim 13 wherein said seat end is further characterized by a conical tip that extends axially from said annular surface.

15. The valve of claim 13 wherein said annular surface is substantially flat and extends at an angle α from flat.

16. The valve of claim 15 wherein said cavity comprises a bowl shaped recess in said valve body facing said diaphragm; said cavity being formed by a curved surface; said annular surface initially engaging and sealing against an edge that defines said port as said diaphragm is moved to its closed position.

17. The valve of claim 1 wherein said web portion has a non-uniform thickness and is thinnest in a central portion thereof.

18. The valve of claim 1 wherein said web portion has a thickness that tapers from said boss and said outer rim towards an intermediate portion thereof.

19. The valve of claim 1 wherein said central boss seat end comprises an annular seat and a conical tip that extends axially from said annular seat.

20. The valve of claim 1 wherein said diaphragm is made of PTFE.

21. The valve of claim 1 wherein said diaphragm is made of non-metallic material.

22. The valve of claim 1 comprising at least one support disk overlaying said convex surface of said diaphragm.

23. The valve of claim 22 wherein said support disk is at least partly disposed between said diaphragm convex surface and an internal surface of an actuator housing that encloses said actuator and is mounted on said valve body.

24. The valve of claim 22 wherein said disk has an inner diameter slightly larger than said central boss and an outer diameter that is less than an inner diameter of said diaphragm outer edge region.

25. The valve of claim 11 wherein said edge surface adjoins a clamping surface that is declined from flat to form a seal edge that engages said outer edge region when the diaphragm and valve are fully assembled.

26. A diaphragm valve comprising:
a valve body having a longitudinal axis and a cavity therein defining a fluid chamber;
a port that opens to said chamber;
a diaphragm that seals said chamber, said diaphragm comprising an outer edge region;
wherein said cavity comprises a bowl shaped recess in said valve body facing said diaphragm; said cavity having a curvilinear surface that is joined by a smooth transition surface to a circumferential edge surface that is substantially parallel said longitudinal axis and said diaphragm outer edge region having a portion that is substantially parallel to said longitudinal axis adjacent said circumferential edge surface of said cavity.

27. The valve of claim 26 wherein said transition surface comprises a radius.

28. The valve of claim 26 wherein said edge surface is substantially parallel to a flow axis of the valve.

* * * * *